Sept. 20, 1971     I. E. BENTOV     3,605,725

CONTROLLED MOTION DEVICES

Filed Aug. 7, 1968     5 Sheets-Sheet 1

INVENTOR
ITZHAK E BENTOV
BY
Wolf, Greenfield + Hicken

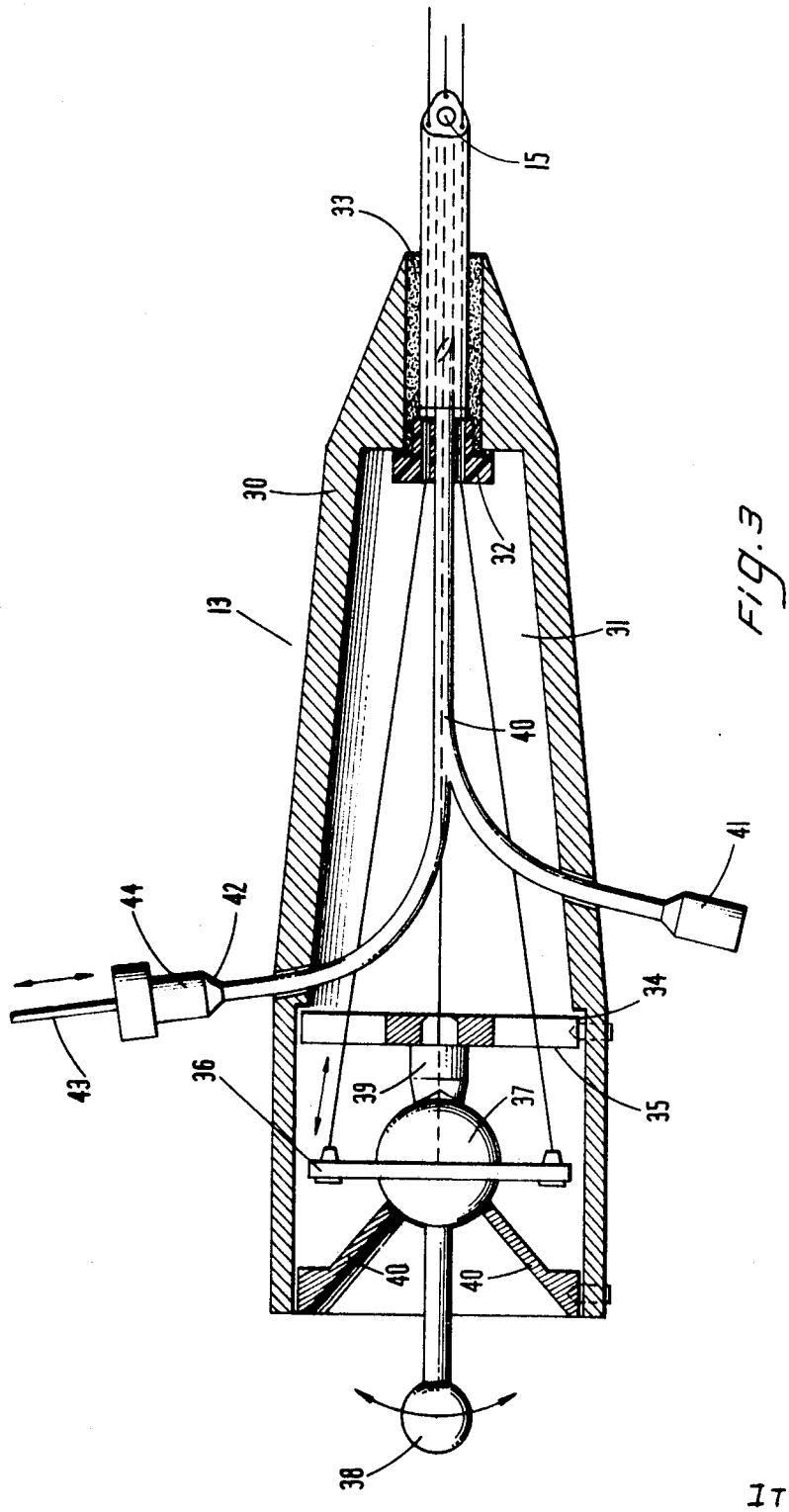

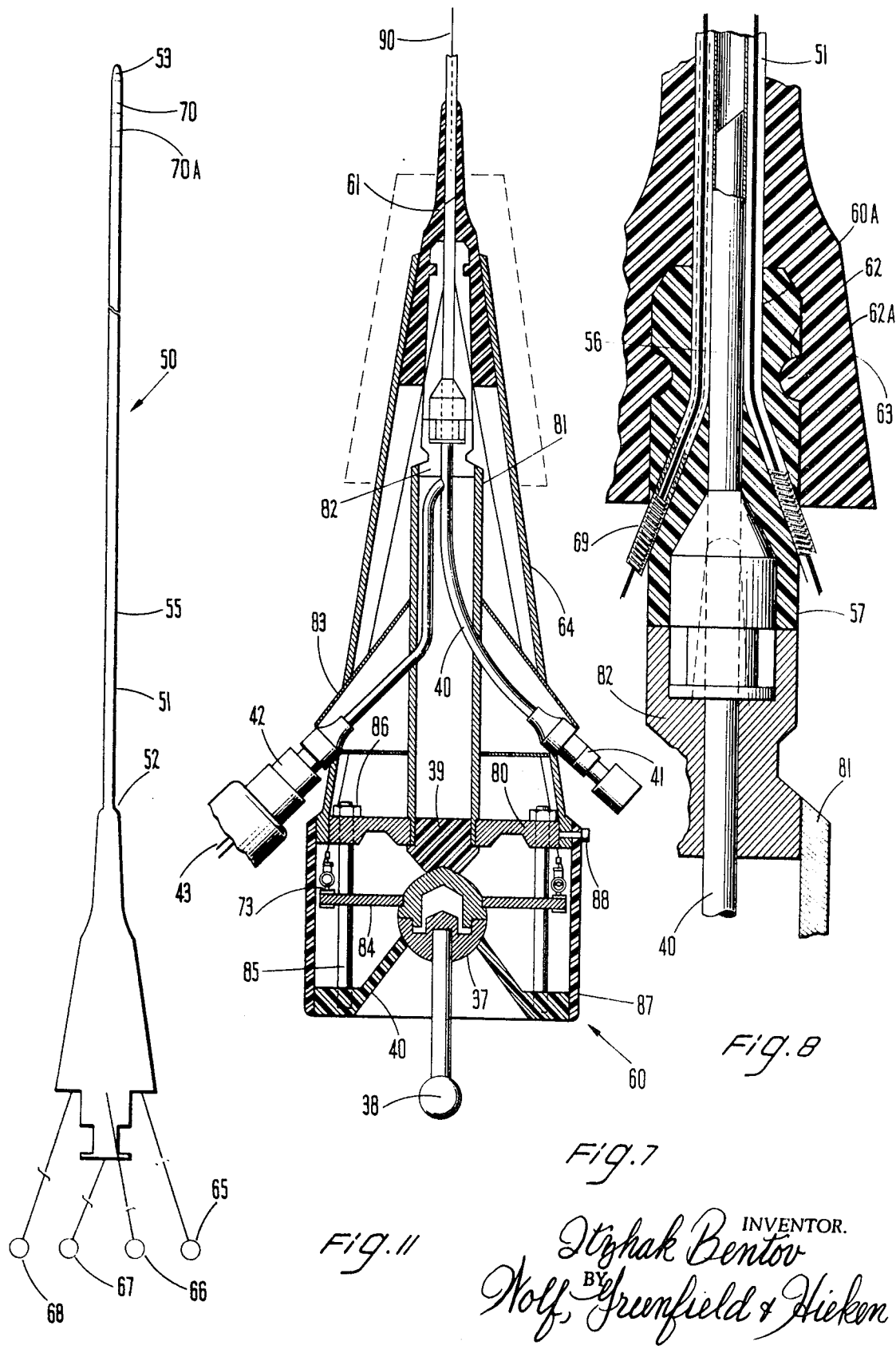

Sept. 20, 1971     I. E. BENTOV     3,605,725
CONTROLLED MOTION DEVICES
Filed Aug. 7, 1968     5 Sheets-Sheet 5
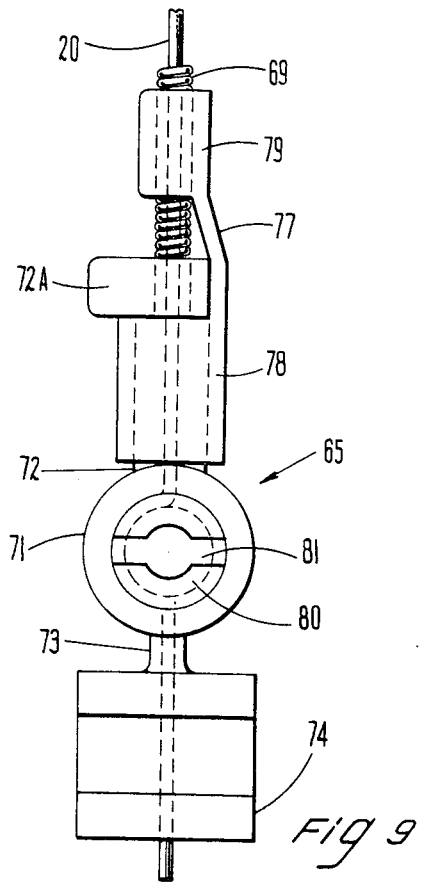
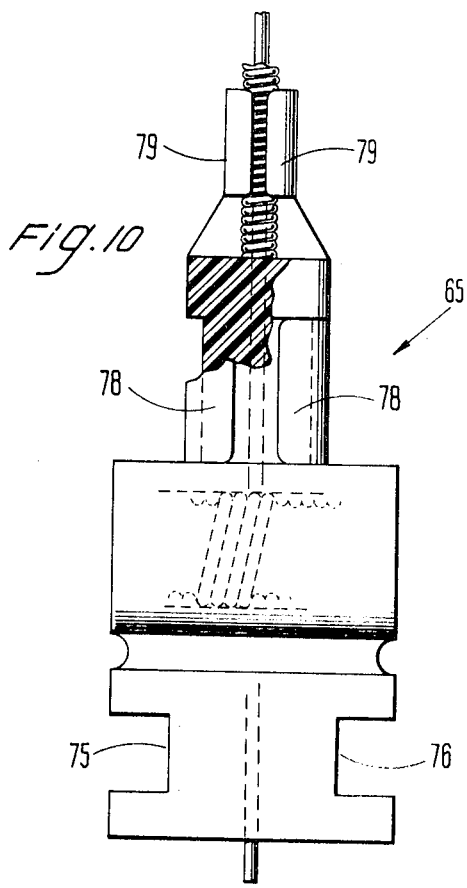
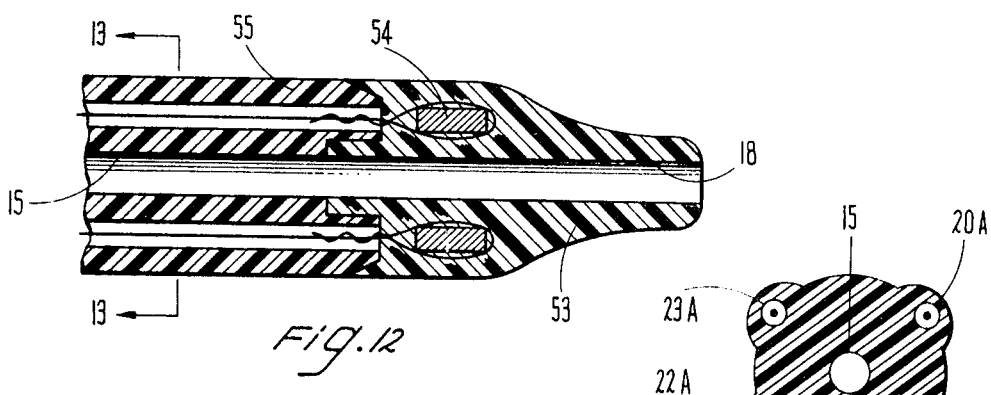

United States Patent Office 3,605,725
Patented Sept. 20, 1971

3,605,725
CONTROLLED MOTION DEVICES
Itzhak E. Bentov, Belmont, Mass., assignor to
Medi-Tech Incorporated, Belmont, Mass.
Continuation-in-part of application Ser. No. 667,296,
Sept. 12, 1967. This application Aug. 7, 1968, Ser.
No. 756,714
Int. Cl. A61m 25/00
U.S. Cl. 128—2.05R                                        8 Claims

ABSTRACT OF THE DISCLOSURE

Controlled motion devices are provided, which may be in the form of a controlled catheter for use in the body, having an elongated flexible tube member with a rear end and a central axis. A forward section of the tube forms a catheter tip and control means extend through the member from the rear end to the tip to cause bending of the tip at selected angles with respect to the central axis upon suitable actuation. A control mechanism is designed for use in controlling movement of the catheter tip. Preferably the catheter has a non-cylindrical, varying diameter along its length and carries means for rapid connection with the control mechanism.

RELATED APPLICATION

This application is a continuation-in-part of copending application Ser. No. 667,296 filed Sept. 12, 1967 now abandoned.

BACKGROUND OF THE INVENTION

A variety of catheters have been known for use in the body. Such catheters are employed in cystoscopic examinations as well as examination of blood and blood vessels. Particularly in the case of blood vessel examinations and testing of blood flow as by introduction of radio-opaque fluids into the blood system, problems have arisen. Catheters must be introduced into blood vessels which branch out in different directions requiring some control means to direct the catheter into one of several possible passageways after the catheter has been introduced into a straight section of the blood vessel. Uncontrolled tubes acting as catheters have been used in some applications but misdirection of the catheter tips often occurs.

The art has turned to certain types of controlled catheters where the tip or remote end of the catheter can be controlled in directions about a 360° circle or at angles to the main axis of the tube. Such controlled catheters of the known type often require torque or rotation along the axis of the catheter and the use of pre-bent catheter tips. In such catheters, a handle at the rear end is rotated until the bent tip finds a branch vessel and pops into it. Due to the inherent flexibility of the long tube between the control end and the bent tip, torsion accumulates as the catheter is twisted to rotate the tip. Often as the tip starts rotating inside a blood vessel, the accumulated torsional moment will tend to unwind, resulting in rapid rotation of the tip inside the vessel. The rapid rotation tends to damage the blood vessel walls and/or cause overshooting of a branch vessel entrance which in turn may require additional rotation and probing before the tip can be brough to enter the preselected vessel.

The problem of controlling the direction of movement of the tip is complicated by the fact that blood vessels are often of small diameter and delicate in nature thus preventing in many cases the use of complicated mechanical means to overcome the problems involved.

SUMMARY OF THE INVENTION

Controlled motion devices particularly suitable for use as controlled catheters are provided and comprise an elongated, flexible tube member having a central axis, a rear end and an elongated side wall defining an axially extending passageway. A forward section of the tube member is formed into a tip as a catheter tip. Elongated control means extend through the tube from the rear end to the tip to cause angular adjustment of the tip with respect to the central axis without rotating the tube. Preferably the forward end of a catheter is controlled in all directions about a 360° circle by means of three or more reins or wires which are preferably spaced at equal arcuate intervals about the central axis and extend from the tip to the rear end.

A control mechanism or member preferably comprising a ball joint mounted plate acts as an anchor for the reins to permit ease of directing the catheter end from the exposed or rear end of the catheter which lies outside of the body in use.

In a preferred embodiment, the catheter tube is non-cylindrical and made of plastic or rubber having varying hardness along its length to facilitate controlled bending.

Because of the control member and control means used in the present invention, no torque or rotation of the catheter about its central axis is required. Thus traumatic action of the catheter is minimized and ease of directing enhanced. In the preferred embodiment, the catheter is rapidly connected or disconnected from the control member to permit reuse of the control member with similar catheters and/or sterilization of components.

BRIEF DESCRIPTION OF THE DRAWINGS

The above and other advantages and features of the present invention will be better understood from the following specification when read in connection with the accompanying drawings in which:

FIG. 3 is a cross sectional view of the control member thereof;

FIG. 7 is a cross sectional view thereof;

FIG. 8 is an enlarged view of the portion in the dotted block of FIG. 7;

FIG. 9 is a side view of an element of a preferred embodiment of the catheter;

FIG. 10 is a front view thereof;

FIG. 11 is a semi-diagrammatic view of a preferred embodiment of the catheter;

FIG. 11a is a semi-diagrammatic view thereof with the tip arranged at an angle;

FIG. 12 is a center cross sectional view through the tip portion thereof; and

FIG. 13 is a cross sectional view through line 13—13 of FIG. 12.

DESCRIPTION OF THE PREFERRED EMBODIMENTS

Figure 1:
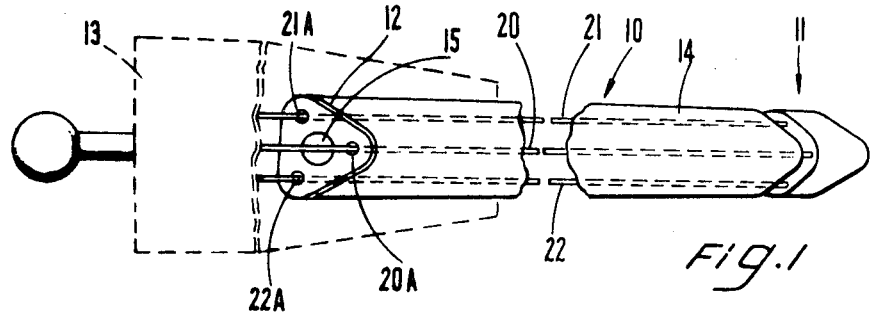
FIG. 1 is a perspective view of an embodiment of a catheter of this invention.

With reference now to the drawings, a first embodiment of the catheter and control member is illustrated at 10 and comprises a catheter forward or tip end 11 and a remote or rear end 12 attached to a control member 13.

The central body section comprising the catheter body is preferably composed of an elongated flexible tube member 14 which can have a circular cross section or a generally triangular cross section as shown. The specific shape is designed as desired so that the catheter will pass freely through blood vessels and the like. A hollow core defines a central lumen passageway 15 aligned with the central axis of the tube 14 passing from one end of the tube to the other. The catheter body section in accordance with known practice is preferably made of an extrusion of flexible material having a low coefficient of friction such as ethylene-vinyl-acetate copolymer, polyethylene, or polyvinyl chloride.

The tip of the catheter has a metal insert 16 perferably with a frusto-conical end and holes 17 in which are mounted flexible control wires or reins. The tip 16 defines a continuous passageway 18 coaxial with passageway 15. Preferably a plastic coating 19 of the same type of material as in the body section 14 covers the metal tip and is integral with the body section 14. The holes 17 are mounted at portions on the arc of a circle having a central axis coincident with the central axis of the passageway 15 and are positioned 120° apart. The control reins 20, 21 and 22 extend preferably parallel to each other, rearwardly from the tip holes 17 through passageways 20a, 21a and 22a respectively in the side wall of the member 14 to the control housing 13. Passageways 20a, 21a and 22a have larger diameters than the diameters of their corresponding control wires enabling the wires to slide freely therein.

The control housing 13 defines a tubular casing 30 which in turn defines a chamber 31. The rear end of the tube 14 abuts a flange 32 having a central passageway and three additional holes allowing the control wires 20, 21 and 22 to pass therethrough with adhesive means 33 bonding the housing to the tube. The control wires pass through a reinforcing plate 34 attached to the housing and having suitable cutout portions 35 and are attached at their ends to a plate 36 perpendicular to the axis of the tube 14. The points of attachment on the plate 36 are 120° apart about a circle in the plane of the plate 36. The center of the plate 36 comprises a fixed spherical ball member 37 having a stick handle 38 passing out through the rear of the housing. The ball 37 is mounted in a seat 39 by a conical flange 40 which is preferably of a Teflon material or other low coefficient of friction material. Thus, the ball 37 is free to move by sliding on its spherical surface thereby simultaneously tensioning and/or relaxing all the control wires 20, 21 and 22 which are taut when the plate 36 is perpendicular to the central axis of tube 14 and the tube is straight.

Since the control wires 20, 21 and 22 pass freely through the passageways provided by the side wall of the tube, movement of plate 36 about the ball seat is transmitted directly to the tip. For this reason, the control wires are preferably nonextensible wires such as stainless steel wire which may be coated with low coefficient of friction materials such as polytetrafluoroethylene.

The control housing preferably mounts means for communicating with the central passageway 15 of the tubular member 14 comprising a Y-shaped tube 40 having its forward end passing into the flange member 32 and axially aligned with passageway 15, One arm 41 of the Y passes outwardly of the casing 30 and carries a conventional Luer lock for use in injecting fluid when desired. A second arm of the Y, 42, passes out of the housing and permits entrance of a stiff guide wire 43 through a conventional fluid seal 44 such as a Touhy-Borst adapter.

Figure 4:
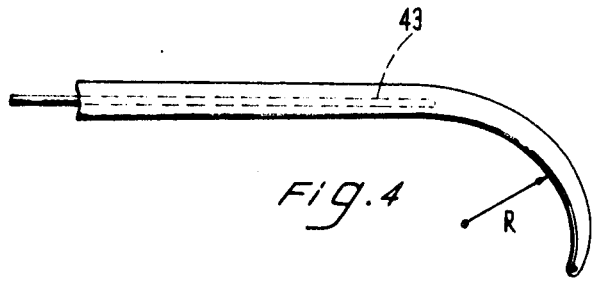
FIGS. 4 and 4a are semi-diagrammatic views showing an element thereof.
Figure 4A:
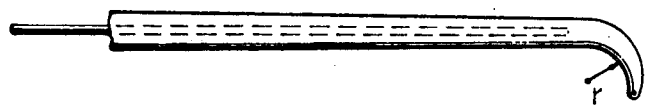

The guide wire 43 facilitates insertion of the catheter into a blood vessel since it stiffens the catheter when inserted as shown in FIGS. 4 and 4a. Moreover, the guide wire is helpful in controlling the radius of curvature of the tip when the guide wires are flexed. Thus, as shown in FIG. 4, when the guide wire is positioned at one distance from the tip 11, it rigidifies a predetermined portion of the catheter and permits bending the tip to a radius R as shown. When the guide wire is inserted further into the catheter as shown in FIG. 4a since it stiffens and tends to rigidify a longer section of the catheter, a much smaller radius of curvature r is obtained as shown in FIG. 4a.

The catheter of this invention can be used in accordance with conventional practice as by entrance of the catheter tip into the blood vessel of a leg. The catheter may then be moved upwardly along with or without the guide wire keeping the tip straight if desired until a branch blood vessel is met whereupon the tip is directed to the vessel as desired by movement of the handle 38. The handle 38 can be moved to obtain corresponding movement of the tip in any direction desired about 360° of a circle perpendicular to the tube 14 or in any angular direction to the axis of the tube.

Figure 5:
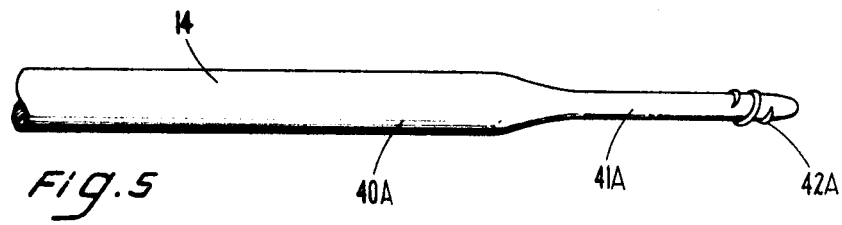
FIG. 5 is a perspective view of an alternate embodiment thereof.

Turning now to the embodiment of FIG. 5, the tip end of the catheter is modified slightly to achieve greater flexibility and east of bending. Thus, in this embodiment the relatively stiff tube 14 is joined to a softer plastic tubing section 40A which has a reduced diameter portion at 41A and carries a helical, round plastic thread 42A. In this embodiment, the metal tip 16 can be mounted at the very end of the catheter in the soft tube portion 41A or may end at the rigid tubing if desired although this is not preferred. Manipulation of the control wires in this embodiment results in ease of angular movement of the tip and maximized maneuverability due to the soft plastic as well as the reduced diameter which provides constantly increasing flexibility toward the tip end from the tube 14.

The soft round plastic thread in helical form as shown at 42A can be used with the embodiment shown in FIG. 5 as well as the embodiment shown in FIG. 1. The helical thread tends to pull the catheter along a blood vessel if the entire catheter is rotated as in a plane perpendicular to its long axis. Thus, although the catheter does not rotate about its own axis, it may rotate about another axis and the helical thread acts as a screw mechanism for pulling the catheter forward or conversely, rearward when the action is reversed.

Figure 6:
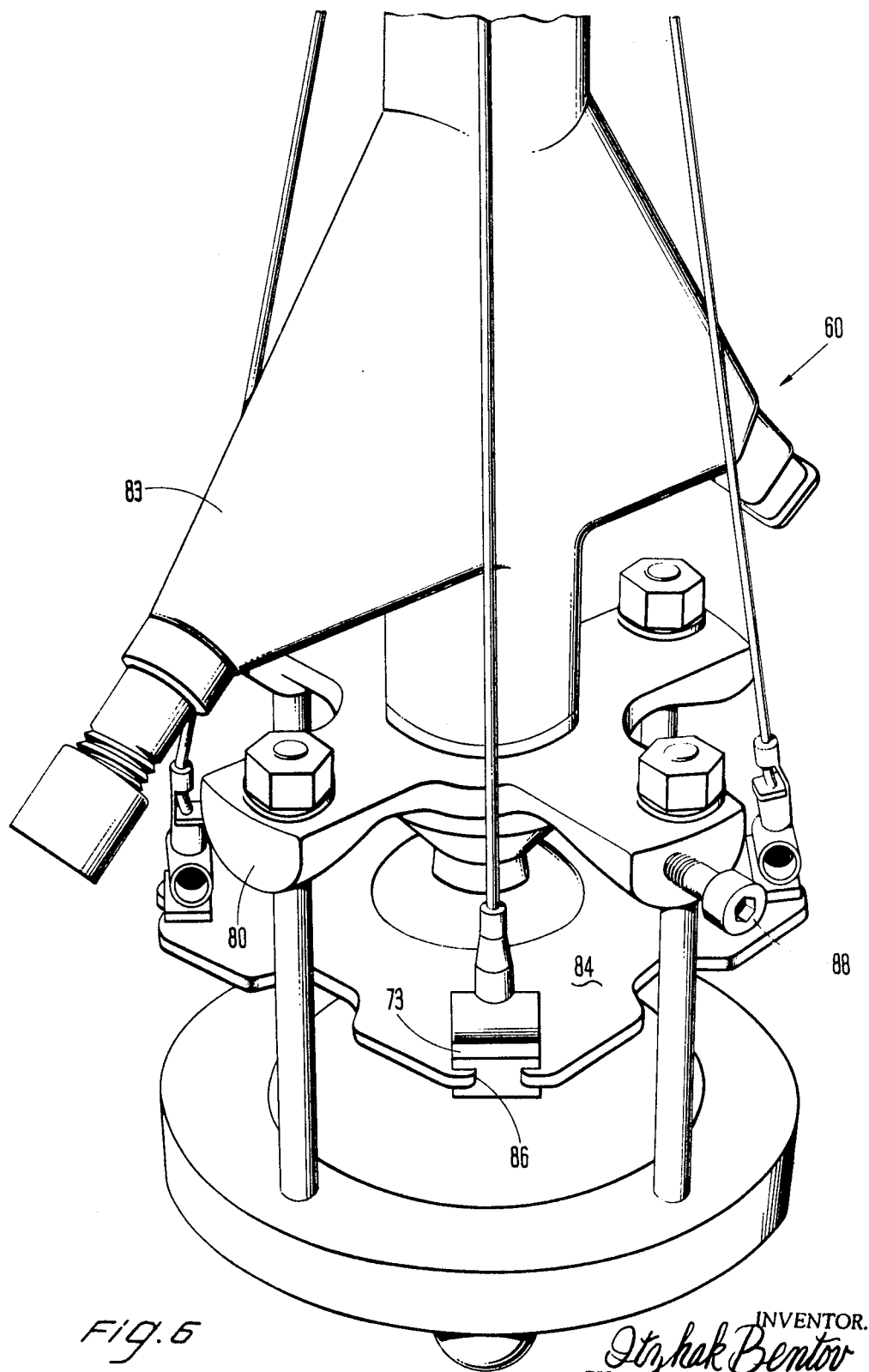
FIG. 6 is a fragmentary perspective view of a preferred embodiment of a control member and attached catheter.

Turning now to FIGS. 6–13, a preferred embodiment of the invention is illustrated at FIG. 11 showing catheter 50 adapted to be readily engaged with or disengaged from a control member 60 (FIG. 6). This embodiment of the invention is basically similar to that described with reference to FIGS. 1–5 and identical parts are given identical numbers. The preferred embodiment incorporates preferred mechanical refinements to facilitate ease of use and sterilization of the controlled motion device of this invention.

The flexible catheter portion 50 preferably tapers uniformly to a slight degree from its proximal end 52 to its distal tip 53 thus having varying cross sectional area from one end to the other. The taper of the catheter facilitates use of a small diameter tip to enter small diameter body openings yet provides a thicker proximal end for preferred mechanical stability. The catheter body section 51 is preferably noncircular as best seen in FIG. 13 although circular cross section constant diameter or other forms can be used. A noncircular cross section is preferred to minimize a tendency of the catheter body section to rotate with respect to its attachment to the control member. Preferably parallel continuous passageways 20a, 21a, 22a and 23a extend throughout the length of the catheter body section and carry control reins 20, 21, 22 and 23 respectively preferably parallel to the central passageway 15. The central passageway 15 leads to a tip passage 18 as previously described with respect to the embodiment of FIG. 1. The embodiment of FIG. 11 differs from the embodiment of FIG. 1 in the use of four control reins and related passageways to maximize desired control. The tip of the catheter portion 50 as best seen in FIG. 12, is preferably formed of a hard plastic such as polypropylene which is substantially rigid and has an embedded, circular, stainless steel ring 54 to which the control reins 20, 21, 22 and 23 are attached at equally spaced points about the circumference of a circle perpendicular to the central axis 14. Thus, the control reins are attached to the ring 54 at 90° intervals. Preferably a soft section 70 and an intermediate hardness section of tube 55 is interposed between the harder main body section of the tube 55 of the catheter body and the tip 53. Sections 70 and 70a can be integral with the tube 55 body or separate tube sections with the parts bonded together by solvent bonds or heat seals.

The proximal end of tube 55, which is preferably a high density substantially rigid polyethylene tube, has a conventional Luer hub needle 56 inserted therein, about which is positioned a plastic encircling attachment end member 57. The tube end 52 is attached to a mating cutout section 60A of the end member 57 as by solvent bonding. The noncircular perimeter of the tube end 52 acts to prevent rotation of the tube with respect to the end member 57. A stress relief member 61 of resilient plastic material is interlocked with the end member 57 by the use of a notch 62 encircling the end member and mating with a projecting rib 62A of the relief member 61. Longitudinally extending grooves in the end member 57 and corresponding ribs in the stress relief member (not shown) are preferably provided to prevent rotation of the member 61 with respect to end member 57. The tip end of the stress relief member extends forwardly to prevent destruction of the tubing or fouling of the control reins when the catheter is bent about its central axis. Preferably the side of the stress relief member is formed by a substantially frusto-conical surface 63 which acts as a support for a casing member 64 of the control mechanism 60 as will be described.

The four control reins extend outwardly of the number 57 through individual flared passageways at 90° degree intervals and carry attachment lugs 65, 66, 67 and 68 at their ends for engagement and disengagement with the control mechanism 60.

Preferably the parts of each of the control reins extending from each lug into a flared passageway in end member 57 are surrounded by thin, helical wire coil springs 69 which permit free passage of the control reins therein and tend to force slack wire back into the passageways 20A, 21A, 22A and 23A of the tubing; thus, aiding in better control of the tip when the control handle 38 is actuated. The springs 69 each preferably extend from the end member 57 to respective attachment lugs 65–68 and take the position shown in FIG. 8 when the catheter is axially aligned with a straight line and equal lengths of the control reins extend from the rear end as shown in FIG. 7. Other resilient means such as resilient plastic tubing can be used in place of the helical springs if desired.

In the preferred embodiment, the tip 53 is attached to a relatively soft flexible distal portion 70 of tubing which may be of a radio-opaque ethylene-vinyl acetate copolymer having a length of about 3 centimeters which is in turn attached to an intermediate hardness plastic section 70a having a length of about 6 centimeters in turn attached to the tubing 55 of high density polyethylene which is relatively harder than the portion 70 or 70a to aid in bending of the tip. The preferred catheter has an over-all length of 100 centimeters with a flexible tip length of about 10 centimeters. The passageway 18 has an inside diameter of 0.035 inch with the tip having an outside diameter of 0.075 inch. The diameter of the passageway 15 at the end 52 is 0.060 inch and the outside diameter of the tubing at the end 52 is 0.095 inch. This catheter permits high flow rates in either direction as desired. The term "diameter" is used with respect to the outside dimension even though the catheter is noncircular in the preferred embodiment, since the variation from a circle is small and the term indicates the longest straight line that can be drawn in a cross section taken perpendicular to the central axis. Preferably the outside diameter of the catheter body section is no greater than 0.25 inch.

Since the lugs 65–68 are identical, only one lug 65 is shown in FIGS. 9 and 10 and will be fully described. The lug 65 is preferably made of a resilient plastic material such as polyethylene and comprises a hollow tubular center portion 71 integral with an upwardly extending sleeve 72, a flat hinge section 73 and a base 74. The base 74 has notches 75 and 76 on opposing sides thereof to permit force fitting of the base onto the control plate of the control mechanism as will be described. A metal tab 77 carries anchoring flaps 78 at a lower end which are bent around and engage the upwardly extending sleeve 72 below an outwardly extending collar 72A. Upper tabs 79 are bent around and mechanically hold the spring 69 of a control rein 20. Control rein 20 passes through the sleeve 72 into the hollow chamber of member 71 and preferably out of the base as best shown in FIG. 9. A portion of the control rein is coiled around a preferably threaded spindle 80 of the member 71 which acts as a slip friction clutch to anchor the control rein. When excessive tension is applied to the catheter the spindle can permit unwinding of the control rein to prevent breaking thereof. The spindle 80 has a T slot 81 to enable adjustment of the control reins to a desired length. Thus, the catheter can be adjusted initially to have each of the control reins of the same length and under slight tension when the catheter is straight and in a neutral position as shown in FIG. 7. The spindle 80 works much in the same manner as the tuning peg of a guitar.

Figure 3A:
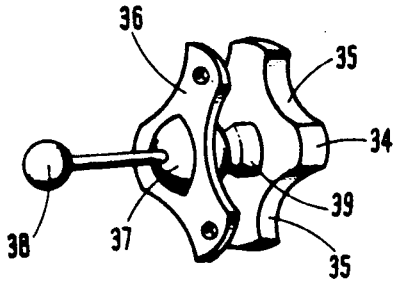
FIG. 3a is a perspective view of an element thereof.
Figure 2:
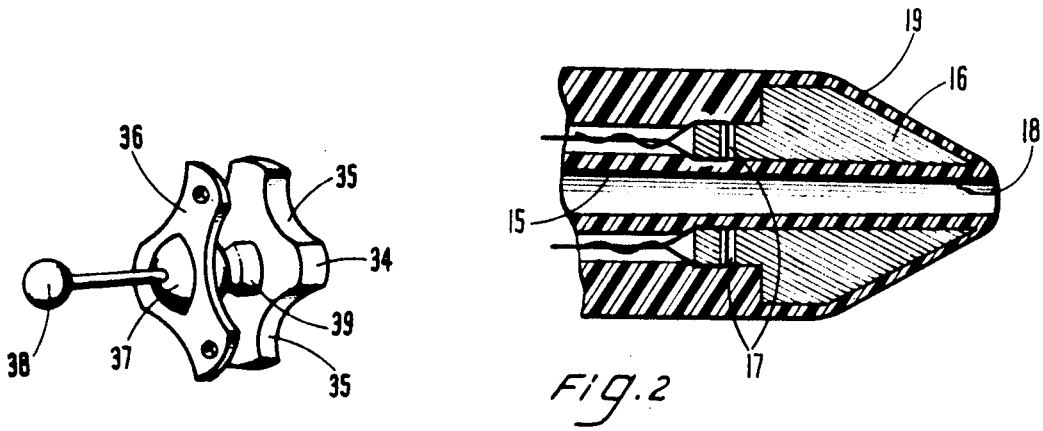
FIG. 2 is a cross sectional view through the tip thereof.

Turning now to the control mechanism 60, it is basically similar to the control mechanism described with respect to FIG. 3. A reinforcing plate 80 is provided having cutout sections as previously described allowing passage of the spring encased control reins. Extending upwardly from the reinforcing plate and rigidly joined thereto is a tubular member 81 carrying a Luer lock 82 of conventional design at its upper end. The Luer lock 82 permits rapid engagement of the Luer lug needle 56 as best shown in FIG. 8. Y-shaped tube 40 extends through the tube 81 and has a fluid seal 42 and an injection Luer end 41 as previously described. Preferably a strengthening triangular metallic member 83 aids in supporting the Y-shaped tube. The control plate 84 is rigidly attached to the spherical ball 37 which is preferably formed of two integral pieces rigidly joined together. The spherical ball 37 is seated in a plastic seat 39 preferably formed of a Teflon member rigidly joined to the reinforcing plate 80. A conical flange member 40 forms a rear section of the control mechanism and has four upwardly extending posts 85 joined to the reinforcing plate by nuts 86. The nuts 86 allow proper tensioning of the spherical ball 37 between the seat 39 and the flange member 40 to permit movement of the ball member as described with regard to the embodiment of FIG. 3.

The control plate 84 is preferably generally square and has equally spaced radially extending notches 86 permitting mounting of the lugs by a force fit engagement as previously described. As will be readily seen from FIGS. 6 and 7, the hinge portions 73 of the lugs permit some degree of arcuate movement of the reins with respect to the control plate when the control plate is moved out of a plane perpendicular to the longitudinal axis of the catheter and control mechanism. The points of interengagement of the lugs with the control plate preferably define a circle having a larger diameter than the diameter of a circle passing through the reins in the catheter body section to permit good response of the tip to movement of the control plate.

Preferably a casing for the control member 60 is formed by the use of a frusto-conical casing member 64 defining opposed U-shaped notches to permit passage over the triangular support 83 and a cylindrical casing member 87 as best shown in FIG. 7. These members are slid over the upper and lower parts of the control mechanism and preferably each carry a U-shaped notch which slides about a threaded stud 88 which extends radially from the control plate. Upon slipping of the casing members into position as shown in FIG. 7, the stud 88 is tightened to hold the casing members in position.

In use of the controlled motion device of the preferred embodiment, it is assembled by removing the casing members 64 and 87. The catheter 50 is then positioned to engage the lower end 56 to the Luer lock 82. Lugs 65, 66, 67 and 68 are then slid into the notches 86 and the control plate positioned as shown in FIG. 7 in a plane perpendicular to the axis 90 of the catheter 50 which is straightened. If necessary, spindles 80 are adjusted to properly adjust the length of the control reins with a slight tension on each rein. Preferably the casing members 64 and 68 are then assembled and the control means is ready for use. After use, the device is disassembled by removing the casing members 64 and 87 and along with lugs 65–68 and releasing the Luer lock. The catheter may be discarded after each use and the control mechanism sterilized. In some cases, the catheter can be reused after sterilization. The control reins 43 can be employed during use as previously described and the catheter tip controlled by the handle 38 as described in connection with the embodiment of FIG. 1.

In operation of the catheter the function of the soft section 70 and intermediate hardness section 70a is apparent as best shown in FIG. 11A. Thus, when the handle 38 actuates tensioning and release of tension on preselected control reins, the sections 70 and 70a bend with two different radii of curvature $r^1$ and $r^2$. The smaller degree of curvature of section 70a permits it to be braced against the wall of a vessel at a bend in the vessel while the tip seeks a branch passageway. While the preferred embodiment 50 uses two sections 70 and 70a having softer properties than the main tube body, one or more softer section can be used. Preferably the main tube body does not respond to control by the reins but only the tip and its adjacent softer sections. In some cases, the entire tube 55 can have increasing softness or flexibility from the proximal end to the tip to enhance bending at the tip. The grading of flexibility in the tube body can be continuous as by the use of varying amounts of plasticizer along the tube or can be a stepwise grading as shown in FIG. 11A.

While specific embodiments of this invention have been shown and described, it should be understood that many variations thereof are possible. For example, the specific control member for the catheter tip can vary greatly in design. Various joint mounting can be made for the ends of the control reins to achieve desired directional movement at the forward end of the catheter. In some cases, the specific materials can vary depending upon the particular use and requirements of any particular application. In all cases, the remote end of the catheter or other controlled motion device can be controlled in all directions in a 360° circle by the use of a plurality of reins spaced at equal intervals about a circle. In some cases, additional reins can be used preferably at equal arcuate spacing about the cross section of tube 14.

It is preferred that no rotational movement occur along the length of the catheter except at the proximal end, thus eliminating snapback due to torsional forces built up along the length of the catheter. The specific constructions of the means for joining the catheter to the control mechanism can vary. Thus, for example, in some cases, no strain relief may be used. In other cases, other than Luer lock mating joints can be used. The passageways for the control reins and the central passageway 15 can be cylindrical or can vary in diameter or cross sectional configuration if desired.

In view of the many modifications possible, this invention is to be limited only by the spirit and scope of the appended claims.

What is claimed is:

1. A catheter comprising an elongated, flexible, hollow tube body having a rear end and an elongated side wall defining a central axis in a lumen passageway, a forward section of said tube body having a catheter tip, said forward section having a first portion and a second portion with said first portion permitting greater bending thereof than said second portion and said second portion permitting greater bending thereof than the remainder of said tube body, control means extending through said tube body from said rear end to said tip to cause bending of said tip at selected angles with respect to said central axis, said control means comprising a plurality of substantially parallel reins attached to said tip at radially spaced points about said central axis, said reins each having a second end extending out of said tube body at said rear end of said tube body, each said second end carrying an attachment lug defining a quick disconnect means for releasably securing said reins to a control member for directing remote movement of said tip with respect to said central axis, said control member being attached to said rear end and carrying a ball member attached to a control plate for movement therewith, said plate having said control rein attachment lugs attached thereto at equally spaced points of a circle lying in a plane perpendicular to said central axis whereby movement of said ball member causes corresponding movement of said catheter tip, passageway quick disconnect means carried by said control member for engagement with said tube body to permit use of said lumen passageway, a ball seat mounting said ball member, and a control handle extending outwardly of said control member for moving said reins.

2. A catheter in accordance with claim 1 wherein said forward section defines said first portion of soft tubing less rigid than said tube body and said second portion of tubing more rigid than said soft tubing but less rigid than said tube body to permit ease of bending said forward section.

3. A catheter in accordance with claim 1 and further comprising said control member having a central passageway for interconnection with said catheter lumen passageway, and a stress relief member surrounding said tube body rear end.

4. A catheter comprising an elongated, flexible, hollow tube body having a rear end and an elongated side wall defining a central axis in a lumen passageway, a forward section of said tube body having a catheter tip, said forward section having a first portion and a second portion with said first portion permitting greater bending thereof than said second portion and said second portion permitting greater bending thereof than the remainder of said tube body, control means extending through said tube body from said rear end to said tip to cause bending of said tip at selected angles with respect to said central axis, said control means comprising a plurality of substantially parallel reins attached to said tip at radially spaced points about said central axis, said reins each having a second end extending out of said tube body at said rear end of said tube body, each said second end carrying an attachment lug defining a quick disconnect means for releasably securing said reins to a control member for directing remote movement of said tip with respect to said central axis, and said attachment lugs each comprising a rein slip clutch, tension adjusting member for adjusting tension in each of said reins.

5. A catheter in accordance with claim 4 wherein said attachment lugs each further comprise a hinge member.

6. A catheter in accordance with claim 5 wherein resilient means surround each of said second ends of said reins for preventing slack in said reins in use.

7. A catheter comprising an elongated, flexible, hollow tube body having a rear end and an elongated side wall defining a central axis in a lumen passageway,
- a forward section of said tube body having a catheter tip,
- said forward section having a first portion and a second portion with said first portion permitting greater bending thereof than said second portion and said second portion permitting greater bending thereof than the remainder of said tube body,
- control means extending through said tube body from said rear end to said tip to cause bending of said tip at selected angles with respect to said central axis,
- said control means comprising a plurality of substantially parallel reins attached to said tip at radially spaced points about said central axis,
- said reins each having a second end extending out of said tube body at said rear end of said tube body,
- each said second end carrying an attachment lug defining a quick disconnect means for releasably securing said reins to a control member for directing remote movement of said tip with respect to said central axis,
- said attachment lugs each comprising a base section carrying said quick means for removable attachment to said control member, a hinge means extending upwardly from said base to permit angular movement of an upper part of each lug with respect to each base, and friction clutch means for use in tensioning said control reins attached to said lugs.

8. A catheter comprising an elongated, flexible, hollow tube body having a rear end and an elongated side wall defining a central axis in a lumen passageway,
- a forward section of said tube body having a catheter tip,
- control means extending through said tube body from said rear end to said tip to cause bending of said tip at selected angles with respect to said central axis,
- said control means comprising a plurality of substantially parallel reins attached to said tip at radially spaced points about said central axis,
- said reins each having a second end extending out of said tube body at said rear end of said tube body,
- each said second end carrying an attachment lug defining a quick disconnect means for releasably securing said reins to a control member for directing remote movement of said tip with respect to said central axis,
- said control member being attached to said rear end and carrying a ball member attached to a control plate for movement therewith,
- said plate having control rein attachment lugs attached thereto at equally spaced points of a circle lying in a plane perpendicular to said central axis whereby movement of said ball member causes corresponding movement of said catheter tip,
- passageway quick disconnect means carried by said control member for engagement with said tube body to permit use of said lumen passageway,
- a ball seat mounting said ball member,
- a control handle extending outwardly of said control member for movement of said reins,
- said attachment lugs each comprising a hinge member and a rein slip clutch, tension adjusting member.

References Cited

UNITED STATES PATENTS

| Number | Date | Name | Class |
|---|---|---|---|
| 204,905 | 6/1878 | Lockwood | 128—349 |
| 2,472,485 | 6/1949 | Krippendorf | 128—349X |
| 3,500,820 | 3/1970 | Almen | 128—348X |
| 1,888,349 | 11/1932 | Jacoby | 128—349 |
| 2,453,862 | 11/1948 | Salisbury | 128—9 |
| 2,975,785 | 3/1961 | Sheldon | 128—6 |
| 3,058,473 | 10/1962 | Whitehead | 128—349 |
| 3,195,369 | 7/1965 | Warhol | 74—501 |
| 3,253,524 | 5/1966 | Ashizawa et al. | 95—11 |
| 3,416,531 | 12/1968 | Edwards | 128—348 |
| 3,470,876 | 10/1969 | Barchilon | 128—348 |

FOREIGN PATENTS

| Number | Date | Country |
|---|---|---|
| 440,731 | 7/1912 | France. |
| 186,005 | 9/1922 | Great Britain. |

DALTON L. TRULUCK, Primary Examiner

U.S. Cl. X.R.

128—7, 348